United States Patent
McCauley et al.

(10) Patent No.: US 9,982,115 B2
(45) Date of Patent: May 29, 2018

(54) PROCESS FOR PREPARING BLENDS OF CIS-1,4-POLYBUTADIENE AND SYNDIOTACTIC 1,2-POLYBUTADIENE

(71) Applicant: Bridgestone Corporation, Chuo-ku (JP)

(72) Inventors: Kevin M. McCauley, Akron, OH (US); Steven Luo, Copley, OH (US)

(73) Assignee: Bridgestone Corporation, Chuo-ku (JP)

(*) Notice: Subject to any disclaimer, the term of this patent is extended or adjusted under 35 U.S.C. 154(b) by 37 days.

(21) Appl. No.: 15/101,310

(22) PCT Filed: Dec. 3, 2014

(86) PCT No.: PCT/US2014/068297
§ 371 (c)(1),
(2) Date: Jun. 2, 2016

(87) PCT Pub. No.: WO2015/084922
PCT Pub. Date: Jun. 11, 2015

(65) Prior Publication Data
US 2016/0304707 A1    Oct. 20, 2016

Related U.S. Application Data

(60) Provisional application No. 61/911,205, filed on Dec. 3, 2013.

(51) Int. Cl.
*B60C 1/00* (2006.01)
*C08L 9/00* (2006.01)
*C08F 136/06* (2006.01)
*F16F 9/04* (2006.01)

(52) U.S. Cl.
CPC ............. *C08L 9/00* (2013.01); *B60C 1/00* (2013.01); *C08F 136/06* (2013.01); *C08F 2410/04* (2013.01); *C08L 2205/025* (2013.01); *F16F 9/0409* (2013.01); *F16F 2224/025* (2013.01)

(58) Field of Classification Search
CPC ................................. C08L 9/00; F16F 9/0409
USPC ........................................................ 524/526
See application file for complete search history.

(56) References Cited

U.S. PATENT DOCUMENTS

| | | | |
|---|---|---|---|
| 3,297,667 A | 1/1967 | von Dohlen et al. | |
| 3,770,710 A | 11/1973 | Futamura et al. | |
| 3,778,424 A | 12/1973 | Sugiura et al. | |
| 3,794,604 A | 2/1974 | Throckmorton et al. | |
| 3,935,180 A | 1/1976 | Sugiura et al. | |
| 4,242,232 A | 12/1980 | Sylvester et al. | |
| 4,255,296 A | 3/1981 | Ogawa et al. | |
| 4,260,707 A | 4/1981 | Sylvester et al. | |
| 4,379,889 A | 4/1983 | Ashitaka et al. | |
| 4,461,883 A | 7/1984 | Takeuchi et al. | |
| 4,476,287 A | 10/1984 | Maehara et al. | |
| 4,575,538 A | 3/1986 | Hsieh et al. | |
| 4,619,982 A | 10/1986 | Jenkins | |
| 4,645,809 A | 2/1987 | Bell | |
| 4,696,984 A | 9/1987 | Carbonaro et al. | |
| 4,710,553 A | 12/1987 | Carbonaro et al. | |
| 4,736,001 A | 4/1988 | Carbonaro et al. | |
| 4,906,706 A | 3/1990 | Hattori et al. | |
| 4,931,376 A | 6/1990 | Ikematsu et al. | |
| 4,967,818 A | 11/1990 | Gartland et al. | |
| 4,990,573 A | 2/1991 | Andreussi et al. | |
| 5,049,220 A * | 9/1991 | Gartland .............. B60C 13/001 152/524 |
| 5,064,910 A | 11/1991 | Hattori et al. | |
| 5,283,294 A | 2/1994 | Hsu et al. | |
| 5,567,784 A | 10/1996 | Wieder et al. | |
| 6,197,888 B1 | 3/2001 | Luo | |
| 6,303,692 B1 | 10/2001 | Luo | |
| 6,320,004 B1 | 11/2001 | Luo | |
| 6,437,205 B1 | 8/2002 | Miller et al. | |
| 6,521,726 B1 | 2/2003 | Kimura et al. | |
| 6,576,725 B1 | 6/2003 | Luo et al. | |

(Continued)

FOREIGN PATENT DOCUMENTS

EP     0511015 A1    10/1992
EP     2028196 A1    2/2009

(Continued)

OTHER PUBLICATIONS

Ashitaka, Hidetomo et al., "Syndiotactic 1,2-Polybutadiene with Co-CS2 Catalyst System. I. Preparation, Properties, and Application of Highly Crystalline Syndiotactic 1,2-Polybutadiene," Journal of Polymer Science: Polymer Chemistry Edition, vol. 21, pp. 1853-1860 (1983).

Ashitaka, Hidetomo et al., "Syndiotactic 1,2-Polybutadiene with Co-CS2 Catalyst System. II.* Catalysts for Stereospecific Polymerization of Butadiene to Syndiotactic 1,2-Polybutadiene," Journal of Polymer Science: Polymer Chemsitry Edition, vol. 21, pp. 1951-1972 (1983).

Ashitaka, Hidetomo et al., "Syndiotactic 1,2-Polybutadiene with Co-CS2 Catalyst System. III.* 1H- and 13C-NMR Study of Highly Syndiotactic 1,2-Polybutadiene," Journal of Polymer Science: Polymer Chemistry Edition, vol. 21, pp. 1973-1988 (1983).

Friebe, Lars et al., "Neodymium-Based Ziegler/Natta Catalysts and their Application in Diene Polymerization," Advances in Polymer Science, vol. 204, pp. 1-154 (20206).

Hsieh, H.L. et al., "Polymerization of Butadiene and Isoprene with Lanthanide Catalysts; Characterization and Properties of Homopdymers and Copolymers," Rubber Chemistry and Technology, vol. 58, No. 1, pp. 117-145 (Mar. 1985).

(Continued)

*Primary Examiner* — Hui Chin
(74) *Attorney, Agent, or Firm* — Meredith E. Hooker; Arthur M. Reginelli

(57) ABSTRACT

A process for preparing a blend of cis-1,4-polybutadiene and syndiotactic 1,2 polybutadiene, the process comprising the steps of (i) polymerizing 1,3-butadiene in the presence of a lanthanide-based catalyst to form a polymerization mixture including cis-1,4-polybutadiene, and (ii) polymerizing 1,3-butadiene in the presence of a cobalt-based catalyst within the polymerization mixture including cis-1,4-polybutadiene to form syndiotactic 1,2-polybutadiene and thereby produce a blend of cis-1,4-polybutadiene and syndiotactic 1,2-polybutadiene.

20 Claims, 1 Drawing Sheet

(56) References Cited

U.S. PATENT DOCUMENTS

| | | |
|---|---|---|
| 6,610,804 B2 | 8/2003 | Luo et al. |
| 6,720,397 B2 | 4/2004 | Luo |
| 6,807,994 B2 | 10/2004 | Westermann et al. |
| 6,897,270 B2 | 5/2005 | Ozawa et al. |
| 6,956,093 B1 | 10/2005 | Hsu et al. |
| 7,008,899 B2 | 3/2006 | Luo et al. |
| 7,094,849 B2 | 8/2006 | Luo et al. |
| 7,288,611 B2 | 10/2007 | Jiang et al. |
| 7,351,776 B2 * | 4/2008 | Tartamella .............. C08F 36/04 525/53 |
| 7,396,889 B2 | 7/2008 | Robert |
| 7,572,867 B2 | 8/2009 | Tartamella et al. |
| 7,799,725 B2 | 9/2010 | Suzuki et al. |
| 7,863,385 B2 | 1/2011 | Asakura et al. |
| 7,868,103 B2 | 1/2011 | Shiba et al. |
| 7,884,155 B2 | 2/2011 | Okamoto et al. |
| 8,067,503 B2 | 11/2011 | Rademacher et al. |
| 8,084,565 B2 | 12/2011 | Suzuki et al. |
| 8,163,821 B2 | 4/2012 | Hiro |
| 2009/0143548 A1* | 6/2009 | Shiba .................... C08C 19/10 526/92 |
| 2014/0011963 A1* | 1/2014 | McCauley ................ C08F 4/12 525/382 |

FOREIGN PATENT DOCUMENTS

| | | |
|---|---|---|
| EP | 2230262 A1 | 9/2010 |
| GB | 1372399 | 10/1974 |
| JP | S57125206 A | 8/1982 |
| JP | S58187408 A | 11/1983 |
| JP | 59122531 * | 7/1984 |
| JP | S59122531 A | 7/1984 |
| JP | 2000256507 * | 9/2000 |
| JP | 2000256507 A | 9/2000 |
| JP | 2006249298 A | 9/2006 |
| JP | 2006249299 A | 9/2006 |
| JP | 2007031568 A | 2/2007 |
| JP | 2007119743 A | 5/2007 |
| JP | 2008163161 A | 7/2008 |
| JP | 2008163162 A | 7/2008 |
| JP | 2008163163 A | 7/2008 |
| JP | 2011184570 A | 9/2011 |
| WO | 02066554 A1 | 8/2002 |
| WO | 2012040026 A1 | 3/2012 |

OTHER PUBLICATIONS

Hollender, C., International Search Report with Written Opinion from PCT/US2014/068297, 12 pp. (dated Apr. 20, 2015).

Quirk, Roderic et al., "Polymerization of butadiene using neodymium versatate-based catalyst systems: preformed catalysts with SiCl4 as halide source", Polymer International, vol. 49, pp. 751-756 (2000).

Shen, Zhiquan et al., "The Characteristics of Lanthanide Coordination Catalysts and the Cis-Polydienes Prepared Therewith," Journal of Polymer Science: Polymer Chemistry Edition, vol. 18, Issue 12, pp. 3345-3357 (Dec. 1980).

Wilson, David J., "A Nd-Carboxylate Catalyst for the Polymerization of 1,3-Butadiene: The Effect of Alkylaluminums and Alyklaluminum Chlorides," Journal of Polymer Science: Part A: Polymer Chemistry, vol. 33, Issue 14, pp. 2505-2513 (Oct. 1995).

* cited by examiner

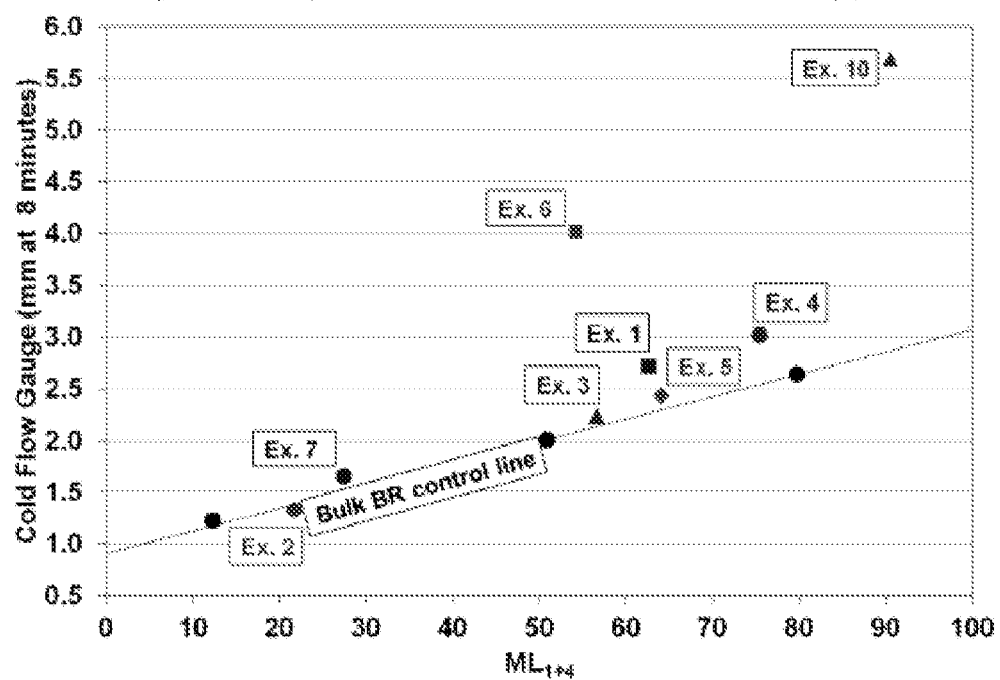

PROCESS FOR PREPARING BLENDS OF CIS-1,4-POLYBUTADIENE AND SYNDIOTACTIC 1,2-POLYBUTADIENE

This application claims the benefit of U.S. Provisional Application Ser. No. 61/911,205, filed on Dec. 3, 2013, which is incorporated herein by reference.

FIELD OF THE INVENTION

One or more embodiments of the present invention relate to a process for producing a blend of cis-1,4-polybutadiene and syndiotactic 1,2-polybutadiene.

BACKGROUND OF THE INVENTION

Conjugated diene polymers are most often produced by solution polymerization, wherein conjugated diene monomers are polymerized in an inert solvent or diluent. The solvent serves to solubilize the reactants and product, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Thermal control is much easier in solution polymerization than in bulk polymerization. Nevertheless, the presence of solvent presents a number of difficulties. The solvent must be separated from the rubber and then recycled for reuse or otherwise disposed of. The cost of recovering and recycling the solvent adds greatly to the cost of the rubber being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

In bulk polymerization (also called mass polymerization), the monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced. Nonetheless, bulk polymerization requires very careful temperature control to avoid a runaway reaction, and there is also the need for strong and elaborate stirring equipment since the viscosity of the polymerization system can become very high.

In bulk polymerization, lanthanide-based catalyst systems that comprise a lanthanide compound, an aluminoxane, and a halogen source are known to be useful for producing conjugated diene polymers having high cis-1,4-linkage contents. The resulting cis-1,4-polybutadienes typically have a cis-1,4-linkage of more than 98.5% and 1,2-linkage lower than 0.3% with molecular weight distributions that vary, but are typically below 2. It is known that cis-1,4-polybutadienes having high cis contents, low vinyl contents, and narrow molecular weight distributions give a greater ability to undergo strain-induced crystallization and lower hysteresis and thus, give superior physical properties such as higher tensile strength and higher abrasion resistance.

Syndiotactic 1,2-polybutadiene is a crystalline thermoplastic resin that has stereoregular structure in which the side-chain vinyl groups are located alternately on the opposite sides in relation to the polymeric main chain. Syndiotactic 1,2-polybutadiene exhibits the properties of both plastics and rubber and is blended into or co-cured with natural and synthetic rubbers. When small amounts of syndiotactic 1,2-polybutadiene is combined with cis-1,4-polybutadiene, the resulting polymer blends exhibit improved cold flow resistance, improved green strength, and improved wear characteristics.

Blends of syndiotactic 1,2-polybutadiene and cis-1,4-polybutadiene are often prepared by mixing the two polymers together at elevated temperatures. This can be problematic because the melting temperature of the syndiotactic 1,2-polybutadiene is often in excess of 180° C. which is above the thermal degradation temperature of the cis-1,4-polybutadiene. Alternatively, the syndiotactic 1,2-polybutadiene can be synthesized within the same vessel as the 1,4-polybutadiene, which thereby provides an even distribution of syndiotactic 1,2-polybutadiene within the cis-1,4-polybutadiene. Often, the different catalysts used to synthesize the two polymers are not compatible with each other and synthetic schemes have to overcome catalyst incompatibility. The in-situ synthesis of the polymer blends also occurs in solution, which has the disadvantages noted above.

Therefore, there exists a need to develop new methods for producing blends of cis-1,4-polybutadiene and syndiotactic 1,2-polybutadiene.

SUMMARY OF THE INVENTION

Embodiments of the present invention provide a process for preparing a blend of cis-1,4-polybutadiene and syndiotactic 1,2 polybutadiene, the process comprising the steps of (i) polymerizing 1,3-butadiene in the presence of a lanthanide-based catalyst to form a polymerization mixture including cis-1,4-polybutadiene, and (ii) polymerizing 1,3-butadiene in the presence of a cobalt-based catalyst within the polymerization mixture including cis-1,4-polybutadiene to form syndiotactic 1,2-polybutadiene and thereby produce a blend of cis-1,4-polybutadiene and syndiotactic 1,2-polybutadiene.

Still other embodiments of the present invention provide a vulcanizable composition comprising the blend of cis-1, 4-polybutadiene and syndiotactic 1,2-polybutadiene prepared by the process of claim 1, a filler, and a curative.

Still other embodiments of the present invention provide a process for preparing a blend of cis-1,4-polybutadiene and syndiotactic 1,2-polybutadiene, the process comprising (i) introducing a lanthanide-based catalyst and 1,3-butadiene monomer to form a polymerization mixture, (ii) allowing the 1,3-butadiene monomer to polymerize to form cis-1,4-polybutadiene and thereby form a polymerization mixture including cis-1,4-polybutadiene, (iii) introducing a cobalt-based catalyst to the polymerization mixture including the cis-1,4-polybutadiene, and (iv) allowing the 1,3-butadiene monomer to polymerize to form syndiotactic 1,2-polybutadiene within the polymerization mixture including the cis-1,4-polybutadiene.

Still other embodiments of the present invention provide a process for preparing a blend of cis-1,4-polybutadiene and syndiotactic 1,2-polybutadiene, the process comprising (i) providing an active polymerization mixture including a propagating cis-1,4-polybutadiene polymer; and (ii) adding a cobalt-based catalyst to the active polymerization mixture including the propagating cis-1,4-polybutadiene polymer.

BRIEF DESCRIPTION OF THE DRAWINGS

The FIGURE is a plot comparing cold flow resistance to polymer Mooney viscosity for polymer samples described herein.

DETAILED DESCRIPTION OF ILLUSTRATIVE EMBODIMENTS

Embodiments of this invention are based, at least in part, on the discovery of a process for producing a blend of cis-1,4-polybutadiene and syndiotactic 1,2-polybutadiene. In one or more embodiments, the process includes polymerizing 1,3-butadiene in the presence of a lanthanide-based catalyst to form a polymerization mixture including cis-1,4-polybutadiene. Then, the process further includes polymerizing 1,3-butadiene within the polymerization mixture including the cis-1,4-polybutadiene in the presence of a cobalt-based catalyst to form syndiotactic 1,2-polybutadiene. In one or more embodiments, it has advantageously been found that the cobalt-based catalyst is not deleteriously impacted by the presence of the lanthanide-based catalyst or residues thereof, and therefore practice of this invention can be performed without isolating the cis-1,4-polybutadiene from the polymerization mixture prior to the introduction of the cobalt-based catalyst. Also, it has advantageously been found that the method of one or more embodiments of the invention evenly disperses the syndiotactic 1,2-polybutadiene into the cis-1,4-polybutadiene without the need for elevated temperatures or vigorous mixing conditions. Still further, it has unexpectedly been discovered that by increasing the amount of cobalt-based catalyst employed, syndiotactic 1,2-polybutadiene can be synthesized even after the synthesis of cis-1,4-polybutadiene in the presence of a modulator that assists in the production of polymer having relatively high cis-1,4-linkage content. Moreover, the synthesis of the cis-1,4-polybutadiene and the syndiotactic 1,2-polybutadiene can be conducted within bulk polymerization systems. In one or more embodiments, the blend of cis-1,4-polybutadiene and syndiotactic 1,2-polybutadiene can be used in the manufacture of tire components and air spring bellows.

In one or more embodiments, a polymerization mixture including cis-1,4-polybutadiene is initially formed by introducing 1,3-butadiene monomer and a lanthanide-based catalyst. Polymerization of the 1,3-butadiene monomer in the presence of the lanthanide-based catalyst forms cis-1,4-polybutadiene within the polymerization mixture. The polymerization mixture may also include solvent and/or other catalyst components or modifiers. Following polymerization of the 1,3-butadiene monomer into cis-1,4-polybutadiene, the polymerization mixture may also include catalyst residues.

In one or more embodiments, the cis-1,4-polybutadiene may include propagating polymer, which may also be referred to as a reactive polymer. In these or other embodiments, the cis-1,4-polybutadiene may include non-propagating polymer. Propagating polymers include polymeric species that are capable of undergoing further polymerization through the addition of monomer. In one or more embodiments, the propagating polymeric species may be referred to as a pseudo-living polymer. Non-propagating polymers include polymeric species that cannot undergo further polymerization through the addition of monomer.

Following the formation of the polymerization mixture including the cis-1,4-polybutadiene, a cobalt-based catalyst is introduced to the polymerization mixture. Optionally, additional 1,3-butadiene monomer is added to the polymerization mixture including the cis-1,4-polybutadiene. The polymerization of 1,3-butadiene monomer in the presence of the cobalt-based catalyst forms syndiotactic 1,2-polybutadiene within the polymerization mixture including the cis-1,4-polybutadiene, thereby forming a blend of cis-1,4-polybutadiene and syndiotactic 1,2-polybutadiene. In one or more embodiments, the cis-1,4-polybutadiene and the syndiotactic 1,2-polybutadiene are the exclusive polymeric species within the polymerization mixture. In these or other embodiments, at least a portion of the cis-1,4-polybutadiene and the syndiotactic 1,2-polybutadiene are chemically linked, thereby forming a block copolymer. In these or other embodiments, a mixture including the cis-1,4-polybutadiene, the syndiotactic 1,2-polybutadiene, and optionally a block copolymer thereof is formed. In yet other embodiments, an interpenetrating network is formed wherein at least one polymer is intimately dispersed within the other polymer. While the exact nature of the polymers may not be known for every embodiment of this invention, the term a blend of cis-1,4-polybutadiene and syndiotactic 1,2-polybutadiene may be used to refer to all compositions including the cis-1,4-polybutadiene, the syndiotactic 1,2-polybutadiene, and optionally the block copolymers thereof.

As previously mentioned, a lanthanide-based catalyst, which may also be referred to as a lanthanide-based catalyst system, may be employed to synthesize cis-1,4-polybutadiene. In one or more embodiments, the lanthanide-based catalyst system employed to synthesize cis-1,4-polybutadiene includes (a) a lanthanide-containing compound, (b) an alkylating agent, and (c) a halogen source. In these or other embodiments, other organometallic compounds, Lewis bases, and/or catalyst modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference. In other embodiments, the synthesis of cis-1,4-polybutadiene takes place in the presence of a polymerization modulator. For example, the polymerization takes place in the presence of an ether, as described in U.S. Pat. Nos. 7,741,418 and 7,977,437, which are incorporated herein by reference. Or, the polymerization takes place in the presence of an amine, as described in WO 2012/040026, which is incorporated herein by reference. Or, the polymerization takes place in the presence of a sulfone, sulfoxide, or phosphine oxide as described in WO 2013/075085, which is incorporated herein by reference. Or, the polymerization takes place in the presence of an organosulfide, as described in WO 2013/138270, which is incorporated herein by reference. In particular embodiments, the lanthanide-based catalyst employs an aluminoxane as an alkylating agent and is activated by a bromine-containing compound as disclosed in U.S. Pat. No. 7,825,201, which is incorporated herein by reference.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis (2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl) phosphonate, and neodymium (p-nonylphenyl) (2-ethylhexyl) phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyephosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis (2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl)(2-ethylhexyl)phosphinate, and neodymium (2-ethylhexyl)(p-nonylphenyl) phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing a halogen atom are employed, the lanthanide-containing compound may optionally also provide all or part of the halogen source in the lanthanide-based catalyst system.

As used herein, the term organolanthanide compound refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

As mentioned above, the lanthanide-based catalyst systems employed in the present invention can include an alkylating agent. In one or more embodiments, alkylating agents, which may also be referred to as hydrocarbylating agents, include organometallic compounds that can transfer one or more hydrocarbyl groups to another metal. Generally, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized in the lanthanide-based catalyst system include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the lanthanide-based catalyst system is aluminoxanes. Aluminoxanes can comprise oligomeric linear aluminoxanes, which can be represented by the general formula:

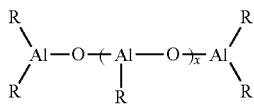

and oligomeric cyclic aluminoxanes, which can be represented by the general formula:

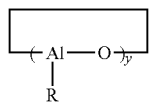

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

In one or more embodiments, aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

As mentioned above, alkylating agents useful in the lanthanide-based catalyst system can include organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the lanthanide-based catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Suitable elemental halogens include, but are not limited to, fluorine, chlorine, bromine, and iodine. Some specific examples of suitable mixed halogens include iodine monochloride, iodine monobromide, iodine trichloride, and iodine pentafluoride.

Suitable hydrogen halides include, but are not limited to, hydrogen fluoride, hydrogen chloride, hydrogen bromide, and hydrogen iodide.

Suitable organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, carbon tetrabromide, tribromomethane, and methyl bromoformate.

Suitable inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In one or more embodiments, the lanthanide-based catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to stearic hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis [3,5-bis(trifluoromethyl)phenyl]borate, and N,N-dimethylanilinium tetrakis [3,5-bis(trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

In one or more embodiments, an active lanthanide-based catalyst is formed by combining or mixing the lanthanide-containing compound, the alkylating agent, and the halogen source. Although one or more active catalyst species are believed to result from the combination of the lanthanide-based catalyst ingredients, the degree of interaction or reaction between the various catalyst ingredients or components is not known with any great degree of certainty. Therefore, the terms "catalyst composition," "active catalyst," and simply "catalyst" encompass a simple mixture of the ingredients, a complex of the various ingredients that is caused by physical or chemical forces of attraction, a chemical reaction product of the ingredients, or a combination of the foregoing.

The foregoing lanthanide-based catalyst composition may have high catalytic activity for polymerizing 1,3-butadiene into cis-1,4-polybutadiene over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide-containing compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide-containing compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide-containing compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide-containing compound is best described in terms of the ratio of the moles of halogen atoms in the halogen source to the moles of lanthanide atoms in the lanthanide-containing compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide-containing compound (An/Ln) may be from about 0.5:1 to about 20:1, in other embodiments from about 0.75:1 to about 10:1, and in other embodiments from about 1:1 to about 6:1.

The lanthanide-based catalyst can be prepared by various methods.

In one embodiment, a lanthanide-based catalyst may be formed in situ by adding the individual catalyst ingredients to a solution containing monomer and solvent, or to bulk monomer, in either a stepwise or simultaneous manner. In one embodiment, the alkylating agent can be added first, followed by the lanthanide-containing compound, and then followed by the halogen source or by the compound containing a non-coordinating anion or the non-coordinating anion precursor.

In another embodiment, the lanthanide-based catalyst may be preformed. That is, the catalyst ingredients are pre-mixed outside the polymerization system either in the absence of any monomer or in the presence of a small amount of at least one conjugated diene monomer at an appropriate temperature, which may be from about −20° C. to about 80° C. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide-containing compound. The resulting catalyst composition may be aged, if desired, prior to being added to the monomer that is to be polymerized.

In yet another embodiment, the lanthanide-based catalyst composition may be formed by using a two-stage procedure. The first stage may involve combining the alkylating agent with the lanthanide-containing compound either in the absence of any monomer or in the presence of a small amount of at least one conjugated diene monomer at an appropriate temperature, which may be from about −20° C. to about 80° C. The amount of monomer employed in the first stage may be similar to that set forth above for pre-forming the catalyst. In the second stage, the mixture formed in the first stage and the halogen source, non-coordinating anion, or non-coordinating anion precursor can be charged in either a stepwise or simultaneous manner to the monomer that is to be polymerized.

Regardless of the method employed to prepare the active lanthanide-based catalyst, the active catalyst that is prepared according to one or more embodiments is formed in the substantial absence of a polymerization modulator. As used herein, reference to a substantial absence refers to that amount of polymerization modulator or less that will not deleteriously impact the formation or performance of the catalyst. In one or more embodiments, the active catalyst is formed in the presence of less than 10 mole, in other embodiments in the presence of less than 2 mole, and in other embodiments in the presence of less than 1 mole of a polymerization modulator per mole of lanthanide metal in the lanthanide-containing compound. In other embodiments, the catalyst is formed in the essential absence of a polymerization modulator, which refers to a de minimis amount or less of polymerization modulator. In particular embodiments, the active catalyst is formed in the complete absence of a polymerization modulator.

In one or more embodiments, a solvent may be employed as a carrier to either dissolve or suspend the lanthanide-based catalyst in order to facilitate the delivery of the lanthanide-based catalyst. In other embodiments, monomer can be used as the carrier. In yet other embodiments, the lanthanide-based catalyst can be used in its neat state without any solvent.

In one or more embodiments, suitable solvents include those organic compounds that will not undergo polymerization or incorporation into propagating polymer chains during the polymerization of monomer in the presence of the lanthanide-based catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

The introduction of the catalyst, the 1,3-butadiene monomer, and any solvent, if employed, forms a polymerization mixture in which the cis-1,4-polybutadiene is formed. The amount of the catalyst to be employed may depend on the interplay of various factors such as the type of catalyst employed, the purity of the ingredients, the polymerization temperature, the polymerization rate and conversion desired, the molecular weight desired, and many other factors. Accordingly, a specific catalyst cannot be definitively set forth except to say that catalytically effective amounts of the catalyst may be used.

In one or more embodiments, the amount of the lanthanide-containing compound used can be varied from about 0.001 to about 2 mmol, in other embodiments from about 0.005 to about 1 mmol, and in still other embodiments from about 0.01 to about 0.5 mmol per 100 gram of 1,3-butadiene monomer provided for the synthesis of the cis-1,4-polybutadiene.

In particular embodiments, after the active catalyst is prepared by either a preforming procedure or in situ, the polymerization of 1,3-butadiene monomer is conducted in presence of the active catalyst and a polymerization modulator. In one or more embodiments, the polymerization modulator is introduced directly and individually to the 1,3-butadiene monomer solution (or bulk monomer) that is to be polymerized (i.e. to the polymerization mixture). In other words, prior to being introduced to the polymerization mixture, the polymerization modulator is not complexed with any of the various catalyst ingredients.

In one or more embodiments, the polymerization modulator may be present in the 1,3-butadiene monomer solution (or bulk 1,3-butadiene monomer) prior to the introduction of the preformed catalyst. For example, where the polymerization modulator is introduced directly and individually to the 1,3-butadiene monomer solution (or bulk 1,3-butadiene monomer), and then the preformed catalyst is introduced to the mixture of the 1,3-butadiene monomer and polymerization modulator. In these embodiments, the introduction of the polymerization modulator to the 1,3-butadiene monomer solution (or bulk 1,3-butadiene monomer) forms a 1,3-butadiene monomer/polymerization modulator blend that is devoid of active catalyst prior to the introduction of the preformed catalyst.

In other embodiments, the polymerization modulator and the preformed catalyst may be added simultaneously, yet separately and individually, to the 1,3-butadiene monomer solution (or bulk 1,3-butadiene monomer) that is to be polymerized.

In other embodiments, the polymerization modulator is introduced to the preformed catalyst before the preformed catalyst is introduced to the 1,3-butadiene monomer solution (or bulk 1,3-butadiene monomer). Therefore, in these embodiments, the polymerization modulator and the preformed catalyst are introduced to the 1,3-butadiene monomer solution (or bulk 1,3-butadiene monomer) as a single stream. For example, where the preformed catalyst is prepared by an in-line preforming procedure as further discussed below, the polymerization modulator can be added to the preformed catalyst in line after formation of the catalyst. In some embodiments, the stream including the polymerization modulator and the preformed catalyst, is introduced to the 1,3-butadiene monomer solution (or bulk 1,3-butadiene monomer) within a relatively short time after the polymerization modulator and the preformed catalyst are brought into contact. In particular embodiments, the stream including the polymerization modulator and the preformed catalyst is introduced to the 1,3-butadiene monomer solution (or bulk 1,3-butadiene monomer) within less than 1 minute after the polymerization modulator and the preformed catalyst are brought into contact.

In other embodiments, the polymerization modulator is introduced to the 1,3-butadiene monomer solution (or bulk 1,3-butadiene monomer) after introduction of the catalyst ingredients for forming the active catalyst or introduction of the preformed catalyst. In other words, the polymerization modulator is introduced to the 1,3-butadiene monomer solution (or bulk 1,3-butadiene monomer) that contains the active catalyst. As described above, the active catalyst may be formed by a preforming procedure or in situ. As those skilled in the art appreciate, where the active catalyst is present in the 1,3-butadiene monomer solution (or bulk 1,3-butadiene monomer) prior to the introduction of the polymerization modulator, the active catalyst may be in the form of propagating oligomeric species at the time the polymerization modulator is introduced. In this regard, those skilled in the art will appreciate that reference to active catalyst may refer to low molecular weight living or pseudo-living oligomeric species. In one or more embodiments, the polymerization modulator is introduced before 5%, in other embodiments before 3%, in other embodiments before 1%, and in other embodiments before 0.5% of the 1,3-butadiene monomer is polymerized.

In one or more embodiments, polymerization modulators include those compounds that, when added to an active catalyst, alter the polymerization process to provide desired results such as higher cis-1,4-linkage content, inhibit reactor fouling and polymer gelation, and/or narrow the molecular weight distribution of the resulting polymer. As mentioned above, examples of known polymerization modulators for lanthanide-based catalyst systems include dihydrocarbyl ethers, amines, sulfones, sulfoxides, phosphine oxides, and organosulfides.

In one or more embodiments, dihydrocarbyl ethers include those compounds represented by the formula R—O—R, where each R, which may be the same or different, is a hydrocarbyl group or substituted hydrocarbyl group. The hydrocarbyl group may contain heteroatoms such as, but not limited to, nitrogen, oxygen, silicon, tin, sulfur, boron, and phosphorous atoms. Examples of hydrocarbyl groups or substituted hydrocarbyl groups include, but are not limited to, alkyl, cycloalkyl, substituted cycloalkyl, alkenyl, cycloalkenyl, aryl, substituted aryl groups and heterocyclic groups. In one or more embodiments, one or both of the hydrocarbyl groups (R) in the dihydrocarbyl ether may contain one or more additional ether linkages (i.e., C—O—C). These ether compounds may be referred to as polyethers.

Suitable types of dihydrocarbyl ethers include, but are not limited to, dialkyl ethers, dicycloalkyl ethers, diaryl ethers, and mixed dihydrocarbyl ethers.

In one or more embodiments, the molar ratio of the dihydrocarbyl ether to the lanthanide compound (ether/Ln) can be varied from 0.5:1 to about 1,000:1, in other embodiments from about 1:1 to about 700:1, and in other embodiments from about 5:1 to about 500:1.

In one or more embodiments, suitable amines include those compounds represented by the formula $NR_3$, where each R is independently a hydrocarbyl group or substituted hydrocarbyl group, or where two or more R groups combine to form a divalent or trivalent organic group.

In certain embodiments, suitable amines include those compounds where the nitrogen atom of the amine has three bonds connected to two or three carbon atoms. Specifically contemplated are those amines where the nitrogen is singly bonded to three carbon atoms (e.g. trihydrocarbylamines). Also specifically contemplated are those amines where the nitrogen is singly bonded to a carbon atom and doubly bonded to a second carbon atom (e.g. aromatic amines such as pyridine).

In one or more embodiments, the amines are tertiary amines. In one or more embodiments, the tertiary amines may include one or more acyclic substituents. In other embodiments, the tertiary amines may include one or more cyclic, non-aromatic substituents. In yet other embodiments, the tertiary amines may include one or more aromatic substituents. In particular embodiments, the tertiary amines are devoid of aromatic substituents bonded directly to the nitrogen atom of the tertiary amine. In one or more embodiments, the tertiary amines are cyclic non-aromatic amines, where the nitrogen atom of the tertiary amine is a member of a non-aromatic ring. In other embodiments, the tertiary amines are aromatic amines, where the nitrogen atom of the tertiary amine is a member of an aromatic ring. In one or more embodiments, the tertiary amines are monodentate compounds, which refers to the presence of only one lone pair of electrons that are capable of binding or coordinating to the lanthanide metal of the lanthanide-containing compound.

In one or more embodiments, the amount of the amine introduced to the monomer solution (or bulk monomer) to be polymerized, and therefore is present during polymerization, may be represented by the molar ratio of the amine to the lanthanide-containing compound (amine/Ln). In one or more embodiments, the amine/Ln molar ratio is at least 10:1, in other embodiments at least 20:1, in other embodiments at least 30:1, and in other embodiments at least 40:1. In these or other embodiments, the amine/Ln molar ratio is less than 80:1, in other embodiments less than 70:1, and in other embodiments less than 60:1. In one or more embodiments, the amine/Ln molar ratio is from about 10:1 to about 80:1, in other embodiments from about 20:1 to about 70:1, and in other embodiments from about 30:1 to about 60:1.

In other embodiments, the amount of the amine introduced to the monomer solution (or bulk monomer) to be polymerized may be expressed with respect to the amount of the monomer. In one or more embodiments, the amount of the amine introduced is at least 0.01 mmol, in other embodiments at least 0.1 mmol, in other embodiments at least 0.2 mmol, in other embodiments at least 0.3 mmol, and in other embodiments at least 0.4 mmol per 100 g of monomer. In these or other embodiments, the amount of the amine introduced is less than 160 mmol, in other embodiments less than 140 mmol, in other embodiments less than 120 mmol, in other embodiments less than 100 mmol, in other embodiments less than 50 mmol, in other embodiments less than 10 mmol, and in other embodiments less than 1.0 mmol per 100 g of monomer.

In one or more embodiments, suitable sulfones include those compounds represented by the formula:

where each R is independently a monovalent organic group, or where the two R groups join to form a divalent group.

In one or more embodiments, suitable sulfoxides include those compounds represented by the formula:

where each R is independently a monovalent organic group, or where the two R groups join to form a divalent organic group.

In one or more embodiments, suitable phosphine oxides include those compounds represented by the formula:

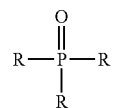

where each R is independently a monovalent organic group, or where two R groups join to form a divalent organic group, or where three R groups join to form a trivalent group.

In one or more embodiments, the monovalent organic groups of the sulfones, sulfoxides, or phosphine oxides may include hydrocarbyl groups including substituted hydrocarbyl groups, or hydrocarbyloxy or substituted hydrocarbyloxy.

Exemplary types of sulfones include dihydrocarbyl sulfones, hydrocarbylene sulfones, dihydrocarbyloxy sulfones (a.k.a. dihydrocarbyl sulfates), and hydrocarbyl hydrocarbyloxy sulfones (a.k.a. hydrocarbyl sulfonates).

Exemplary types of sulfoxides include dihydrocarbyl sulfoxides, hydrocarbylene sulfoxides, dihydrocarbyloxy sulfoxides (a.k.a. dihydrocarbyl sulfites), and hydrocarbyl hydrocarbyloxy sulfoxides (a.k.a. hydrocarbyl sulfinates).

Exemplary types of phosphine oxides include trihydrocarbylphosphine oxides, (hydrocarbyl)(hydrocarbylene) phosphine oxides, trihydrocarbyloxyphosphine oxides (a.k.a. trihydrocarbyl phosphate), (dihydrocarbyl)(hydrocarbyloxy)phosphine oxides (a.k.a. hydrocarbyl phosphinate), (hydrocarbyl)(dihydrocarbyloxy)phosphine oxides (a.k.a. dihydrocarbyl phosphonate), and (hydrocarbyloxy)(hydrocarbylene)phosphine oxides (a.k.a. hydrocarbyl phosphinate).

In one or more embodiments, the amount of the sulfone, sulfoxide, or phosphine oxide introduced to the monomer solution (or bulk monomer) to be polymerized, and therefore is present during polymerization, may be represented by the molar ratio of the polymerization modulator to the lanthanide-containing compound (polymerization modulator/ Ln). In one or more embodiments, the sulfone, sulfoxide, or phosphine oxide/Ln molar ratio is at least 0.1:1, in other embodiments at least 0.2:1, in other embodiments at least 0.5:1, and in other embodiments at least 1:1. In these or other embodiments, the sulfone, sulfoxide, or phosphine oxide/Ln molar ratio is less than 10:1, in other embodiments less than 5:1, and in other embodiments less than 2:1. In one or more embodiments, the sulfone, sulfoxide, or phosphine oxide/Ln molar ratio is from about 0.1:1 to about 10:1, in other embodiments from about 0.2:1 to about 5:1, and in other embodiments from about 0.5:1 to about 2:1.

In one or more embodiments, suitable organosulfides include those compounds represented by the formula R—S—R, where each R is independently a monovalent organic group, or where two R groups combine to form a divalent organic group. In one or more embodiments, the monovalent organic group is a hydrocarbyl group or substituted hydrocarbyl group.

Suitable types of organosulfides include, but are not limited to, dialkyl sulfides, dicycloalkyl sulfides, diaryl sulfides, alkyl cycloalkyl sulfides, alkyl aryl sulfides, cycloalkyl aryl sulfides, cyclic non-aromatic sulfides, and aromatic sulfides.

In one or more embodiments, the amount of the organosulfide introduced to the monomer solution (or bulk monomer) to be polymerized, and therefore is present during polymerization, may be represented by the molar ratio of the organosulfide to the lanthanide-containing compound (organosulfide/Ln). In one or more embodiments, the organosulfide/Ln molar ratio is at least 10:1, in other embodiments at least 20:1, in other embodiments at least 30:1, in other embodiments at least 60:1, and in other embodiments at least 80:1. In these or other embodiments, the organosulfide/Ln molar ratio is less than 120:1, in other embodiments less than 80:1, and in other embodiments less than 60:1. In one or more embodiments, the organosulfide/Ln molar ratio is from about 10:1 to about 120:1, in other embodiments from about 20:1 to about 80:1, and in other embodiments from about 40:1 to about 100:1.

In other embodiments, the amount of the organosulfide introduced directly and individually to the monomer solution (or bulk monomer) to be polymerized may be expressed with respect to the amount of the monomer. In one or more embodiments, the amount of the organosulfide introduced is at least 0.01 mmol, in other embodiments at least 0.03 mmol, in other embodiments at least 0.2 mmol, in other embodiments at least 0.5 mmol, and in other embodiments at least 1.0 mmol per 100 g of monomer. In these or other embodiments, the amount of the organosulfide introduced is less than 100 mmol, in other embodiments less than 90 mmol, in other embodiments less than 70 mmol, in other embodiments less than 60 mmol, in other embodiments less than 50 mmol, in other embodiments less than 20 mmol, and in other embodiments less than 1.0 mmol per 100 g of monomer.

In one or more embodiments, the polymerization of 1,3-butadiene into cis-1,4-polybutadiene and/or syndiotactic 1,2-polybutadiene may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed for polymerizing 1,3-butadiene into cis-1,4-polybutadiene and/or syndiotactic 1,2-polybutadiene may be generally considered a bulk polymerization system that includes substantially no solvent or a minimal amount of solvent. Those skilled in the art will appreciate the benefits of bulk polymerization processes (i.e., processes where monomer acts as the solvent), and therefore the bulk polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization mixtures that are substantially devoid of solvent may be referred to as including substantially no solvent. In particular embodiments, the polymerization mixture is devoid of solvent.

As explained above, once a desired conversion of 1,3-butadiene into cis-1,4-polybutadiene is achieved within the polymerization mixture, the polymerization of 1,3-butadiene into syndiotactic 1,2-polybutadiene is performed within the polymerization mixture by introducing a cobalt-based catalyst to the polymerization mixture. Advantageously, the polymerization of 1,3-butadiene into syndiotactic 1,2-polybutadiene in the presence of the cobalt-based catalyst can be performed without isolation of the cis-1,4-polybutadiene or purification (e.g. removal of catalyst residues) of the polymerization mixture containing the cis-1,4-polybutadiene. Additionally, the polymerization of the 1,3-butadiene into syndiotactic 1,2-polybutadiene can take place without the addition of any quenching agents for the inactivation of active polymer, catalyst and/or catalyst residues, or without the use of any modifiers that might facilitate transition to a new polymerization system. In one or more embodiments, however, quenching agents may be added the polymerization mixture including the cis-1,4-polybutadiene prior to introducing the cobalt-based catalyst. Likewise, in one or more embodiments, the polymerization mixture including the cis-1,4-polybutadiene may be purified or manipulated prior to introducing the cobalt-based catalyst.

The timing of the addition of the cobalt-based catalyst to the polymerization mixture containing the cis-1,4-polybutadiene may vary depending on a number of factors. For example, the timing may vary depending on the solids content of the polymerization mixture, the processing equipment, and the process design being employed. In one or more embodiments, the cobalt-based catalyst is added to the polymerization mixture after the conversion of 1,3-butadiene into cis-1,4-polybutadiene reaches at least 5%, in other embodiments at least 10%, in other embodiments at least 20%, in other embodiments at least 50%, and in other embodiments at least 80% based upon the 1,3-butadiene monomer provided for the synthesis of the cis-1,4-polybutadiene. In these or other embodiments, the cobalt-based catalyst is added to the polymerization mixture before the conversion of 1,3-butadiene into cis-1,4-polybutadiene reaches at most 90%, in other embodiments at most 70%, in other embodiments at most 50%, in other embodiments at most 20%, and in other embodiments at most 15% based on the 1,3-butadiene monomer provided for the synthesis of the cis-1,4-polybutadiene. In particular embodiments, the cobalt-based catalyst is added to the polymerization mixture after complete conversion of all or substantially all of the 1,3-butadiene monomer provided for the synthesis of the cis-1,4-polybutadiene. The skilled person understands that the complete conversion of all or substantially all of the 1,3-butadiene monomer provided for the synthesis of the cis-1,4-polybutadiene will subsequently require the addition of additional 1,3-butadiene monomer in order to synthesize the syndiotactic 1,2-polybutadiene.

In one or more embodiments, the cobalt-based catalyst, which may be referred to as the cobalt-based catalyst system, may include (a) a cobalt-containing compound, (b) carbon disulfide, and (c) an organoaluminum compound.

The cobalt-based catalyst system can include a cobalt-containing compound. In one or more embodiments, these cobalt-containing compounds are soluble in hydrocarbon solvents such as aromatic hydrocarbons, aliphatic hydrocarbons, or cycloaliphatic hydrocarbons. Hydrocarbon-insoluble cobalt-containing compounds, however, can be suspended in the polymerization medium to form the catalytically active species and are also useful.

The cobalt atom in the cobalt-containing compounds can be in various oxidation states including but not limited to the 0, +2, +3, and +4 oxidation states. In particular embodiments, divalent cobalt compounds, wherein the cobalt atom is in the +2 oxidation state, and/or trivalent cobalt compounds, wherein the cobalt atom is in the +3 oxidation state, are employed.

Suitable cobalt-containing compounds include, but are not limited to, cobalt carboxylates, cobalt organophosphates, cobalt organophosphonates, cobalt organophosphinates, cobalt carbamates, cobalt dithiocarbamates, cobalt xanthates, cobalt β-diketonates, cobalt alkoxides or aryloxides, cobalt halides, cobalt pseudo-halides, cobalt oxyhalides, and organocobalt compounds.

Suitable cobalt carboxylates include, but are not limited to, cobalt(II) formate, cobalt(III) formate, cobalt(II) acetate, cobalt(III) acetate, cobalt(II) acrylate, cobalt(III) acrylate, cobalt(II) methacrylate, cobalt(III) methacrylate, cobalt(II) valerate, cobalt(III) valerate, cobalt(II) gluconate, cobalt(III) gluconate, cobalt(II) citrate, cobalt(III) citrate, cobalt(II) fumarate, cobalt(III) fumarate, cobalt(II) lactate, cobalt(III) lactate, cobalt(II) maleate, cobalt(III) maleate, cobalt(II) oxalate, cobalt(III) oxalate, cobalt(II) 2-ethylhexanoate, cobalt(III) 2-ethylhexanoate, cobalt(II) neodecanoate, cobalt (III) neodecanoate, cobalt(II) naphthenate, cobalt(III) naphthenate, cobalt(II) stearate, cobalt(III) stearate, cobalt(II) oleate, cobalt(III) oleate, cobalt(II) benzoate, cobalt(III) benzoate, cobalt(II) picolinate, and cobalt(III) picolinate.

Suitable cobalt organophosphates include, but are not limited to, cobalt(II) dibutylphosphate, cobalt(III) dibutylphosphate, cobalt(II) dipentylphosphate, cobalt(III) dipentylphosphate, cobalt(II) dihexylphosphate, cobalt(III) dihexylphosphate, cobalt(II) diheptylphosphate, cobalt(III) diheptylphosphate, cobalt(II) dioctylphosphate, cobalt(III) dioctylphosphate, cobalt(II) bis(1-methylheptyl) phosphate, cobalt (III) bis(1-methylheptyl) phosphate, cobalt(II) bis(2-ethylhexyl) phosphate, cobalt (III) bis(2-ethylhexyl) phosphate, cobalt(II) didecylphosphate, cobalt(III) didecylphosphate, cobalt(II) didodecylphosphate, cobalt(III) didodecylphosphate, cobalt(II) dioctadecylphosphate, cobalt (III) dioctadecylphosphate, cobalt(II) dioleylphosphate, cobalt(III) dioleylphosphate, cobalt(II) diphenylphosphate, cobalt(III) diphenylphosphate, cobalt(II) bis(p-nonylphenyl) phosphate, cobalt (III) bis(p-nonylphenyl) phosphate, cobalt (II) butyl (2-ethylhexyl) phosphate, cobalt (III) butyl (2-ethylhexyl) phosphate, cobalt(II) (1-methylheptyl)(2-ethylhexyl)phosphate, cobalt(III) (1-methylheptyl)(2-ethylhexyl) phosphate, cobalt (II) (2-ethylhexyl) (p-nonylphenyl) phosphate, and cobalt(III) (2-ethylhexyl) (p-nonylphenyl) phosphate.

Suitable cobalt organophosphonates include, but are not limited to, cobalt(II) butyl phosphonate, cobalt(III) butylphosphonate, cobalt(II) pentylphosphonate, cobalt(III) pentylphosphonate, cobalt(II) hexyl phosphonate, cobalt(III) hexyl phosphonate, cobalt(II) heptylphosphonate, cobalt (III) heptylphosphonate, cobalt(II) octylphosphonate, cobalt (III) octylphosphonate, cobalt(II) (1-methylheptyl)phosphonate, cobalt (III) (1-methylheptyl)phosphonate, cobalt(II) (2-ethylhexyl)phosphonate, cobalt (III) (2-ethylhexyl)phosphonate, cobalt(II) decylphosphonate, cobalt(III) decylphosphonate, cobalt(II) dodecylphosphonate, cobalt(III) dodecylphosphonate, cobalt (II) octadecylphosphonate, cobalt (III) octadecylphosphonate, cobalt(II) oleylphosphonate, cobalt(III) oleylphosphonate, cobalt(II) phenylphosphonate, cobalt(III) phenylphosphonate, cobalt(II) (p-nonylphenyl) phosphonate, cobalt(III) (p-nonylphenyephosphonate, cobalt(II) butylbutylphosphonate, cobalt(II) butylbutylphosphonate, cobalt(II) pentylpentylphosphonate, cobalt(II) pentylpentylphosphonate, cobalt(II) hexylhexylphosphonate, cobalt(III) hexylhexylphosphonate, cobalt(II) heptylheptylphosphonate, cobalt(III) heptylheptylphosphonate, cobalt (II) octyloctylphosphonate, cobalt (III) octyloctylphosphonate, cobalt (II) (1-methylheptyl) (1-methylheptyl) phosphonate, cobalt(III) (1-methylheptyl)(1-methylheptyl)phosphonate, cobalt(II) (2-ethylhexyl) (2-ethylhexyl) phosphonate, cobalt(III) (2-ethylhexyl) (2-ethylhexyl) phosphonate, cobalt(II) decyldecylphosphonate, cobalt(III) decyldecylphosphonate, cobalt(II) dodecyldodecylphosphonate, cobalt (III) dodecyldodecylphosphonate, cobalt(II) octadecyloctadecylphosphonate, cobalt(III) octadecyloctadecylphosphonate, cobalt(II) oleyloleylphosphonate, cobalt(III) oleyl oleylphosphonate, cobalt(II) phenylphenylphosphonate, cobalt(III) phenyl phenylphosphonate, cobalt(II) (p-nonylphenyl)(p-nonylphenyl) phosphonate, cobalt(III) (p-nonylphenyl) (p-nonylphenyl) phosphonate, cobalt (II) butyl (2-ethylhexyl) phosphonate, cobalt (III) butyl (2-ethylhexyl) phosphonate, cobalt (II) (2-ethylhexyl) butylphosphonate, cobalt(III) (2-ethylhexyl) butylphosphonate, cobalt(II) (1-methylheptyl) (2-ethylhexyl) phosphonate, cobalt (III) (1-methylheptyl) (2-ethylhexyl) phosphonate, cobalt(II) (2-ethylhexyl) (1-methylheptyl)phosphonate, cobalt(III) (2-ethylhexyl) (1-methylheptyl) phosphonate, cobalt (II) (2-ethylhexyl) (p-nonylphenyl) phosphonate, cobalt(III) (2-ethylhexyl)(p-nonylphenyl)phosphonate, cobalt(II) (p-nonylphenyl) (2-ethylhexyl)phosphonate, and cobalt(III) (p-nonylphenyl) (2-ethylhexyl)phosphonate.

Suitable cobalt organophosphinates include, but are not limited to, cobalt(II) butylphosphinate, cobalt(III) butylphosphinate, cobalt(II) pentylphosphinate, cobalt(III) pentylphosphinate, cobalt(II) hexylphosphinate, cobalt(III) hexylphosphinate, cobalt(II) heptylphosphinate, cobalt(III) heptylphosphinate, cobalt(II) octylphosphinate, cobalt(III) octylphosphinate, cobalt(II) (1-methylheptyl) phosphinate, cobalt (III) (1-methylheptyl)phosphinate, cobalt(II) (2-ethylhexyl)phosphinate, cobalt(III) (2-ethylhexyl)phosphinate, cobalt(II) decylphosphinate, cobalt(III) decylphosphinate, cobalt(II) dodecylphosphinate, cobalt(III) dodecylphosphinate, cobalt(II) octadecylphosphinate, cobalt(III) octadecylphosphinate, cobalt(II) oleylphosphinate, cobalt(III) oleylphosphinate, cobalt(II) phenylphosphinate, cobalt(III) phenylphosphinate, cobalt(II) (p-nonylphenyl) phosphinate, cobalt(III) (p-nonylphenyl) phosphinate, cobalt (II) dibutylphosphinate, cobalt(III) dibutylphosphinate, cobalt(II) dipentylphosphinate, cobalt(III) dipentylphosphinate, cobalt (II) dihexylphosphinate, cobalt(III) dihexylphosphinate, cobalt(II) diheptylphosphinate, cobalt(III) diheptylphosphinate, cobalt(II) dioctylphosphinate, cobalt(III) dioctylphosphinate, cobalt(II) bis(1-methylheptyl)phosphinate, cobalt (III) bis(1-methylheptyl)phosphinate, cobalt (II) bis(2-ethylhexyl)phosphinate, cobalt (III) bis(2-ethylhexyl) phosphinate, cobalt (II) didecylphosphinate, cobalt(III) didecylphosphinate, cobalt(II) didodecylphosphinate, cobalt (III) didodecylphosphinate, cobalt(II) dioctadecylphosphinate, cobalt(III) dioctadecylphosphinate, cobalt(II) dioleylphosphinate, cobalt(III) dioleylphosphinate, cobalt(II) diphenylphosphinate, cobalt(III) diphenylphosphinate, cobalt(II) bis(p-nonylphenyl) phosphinate, cobalt (III) bis (p-nonylphenyl) phosphinate, cobalt (II) butyl(2-ethylhexyl) phosphinate, cobalt(III) butyl(2-ethylhexyl)phosphinate, cobalt(II) (1-methylheptyl) (2-ethylhexyl)phosphinate, cobalt (III) (1-methylheptyl)(2-ethylhexyl)phosphinate, cobalt(II) (2-ethylhexyl)(p-nonylphenyl)phosphinate, and cobalt(III) (2-ethylhexyl) (p-nonylphenyl) phosphinate.

Suitable cobalt carbamates include, but are not limited to, cobalt(II) dimethylcarbamate, cobalt(III) dimethylcarbamate, cobalt(II) diethylcarbamate, cobalt(III) diethylcarbamate, cobalt(II) diisopropylcarbamate, cobalt(III) diisopropylcarbamate, cobalt(II) dibutylcarbamate, cobalt(III) dibutylcarbamate, cobalt(II) dibenzylcarbamate, and cobalt (III) dibenzylcarbamate.

Suitable cobalt dithiocarbamates include, but are not limited to, cobalt(II) dimethyldithiocarbamate, cobalt(III) dimethyldithiocarbamate, cobalt(II) diethyldithiocarbamate, cobalt(III) diethyldithiocarbamate, cobalt(II) diisopropyldithiocarbamate, cobalt(III) diisopropyldithiocarbamate, cobalt(II) dibutyldithiocarbamate, cobalt (III) dibutyldithiocarbamate, cobalt(II) dibenzyldithiocarbamate, and cobalt (III) dibenzyldithiocarbamate.

Suitable cobalt xanthates include, but are not limited to, cobalt(II) methylxanthate, cobalt(III) methylxanthate, cobalt (II) ethylxanthate, cobalt(III) ethylxanthate, cobalt(II) isopropylxanthate, cobalt(III) isopropylxanthate, cobalt(II) butylxanthate, cobalt(III) butylxanthate, cobalt(II) benzylxanthate, and cobalt(III) benzylxanthate.

Suitable cobalt β-diketonates include, but are not limited to, cobalt(II) acetylacetonate, cobalt(III) acetylacetonate, cobalt(II) trifluoroacetylacetonate, cobalt(III) trifluoroacetylacetonate, cobalt(II) hexafluoroacetylacetonate, cobalt(III) hexafluoroacetylacetonate, cobalt(II) benzoylacetonate, cobalt(III) benzoylacetonate, cobalt(II) 2,2,6,6-tetramethyl-3,5-heptanedionate, and cobalt(III) 2,2,6,6-tetramethyl-3,5-heptanedionate.

Suitable cobalt alkoxides or aryloxides include, but are not limited to, cobalt(II) methoxide, cobalt(III) methoxide, cobalt(II) ethoxide, cobalt(III) ethoxide, cobalt(II) isopropoxide, cobalt(III) isopropoxide, cobalt(II) 2-ethylhexoxide, cobalt(III) 2-ethylhexoxide, cobalt(II) phenoxide, cobalt(III) phenoxide, cobalt(II) nonylphenoxide, cobalt(III) nonylphenoxide, cobalt(II) naphthoxide, and cobalt(III) naphthoxide.

As used herein, the term organocobalt compound refers to any cobalt compound containing at least one covalent cobalt-carbon bond. Suitable organocobalt compounds include bis(cyclopentadienyl) cobalt(II), bis(pentamethylcyclopentadienyl) cobalt(II), bis(pentadienyl) cobalt(II), bis(2, 4-dimethylpentadienyl) cobalt(II), bis(allyl)dicarbonylcobalt (II), (cyclopentadienyl) (pentadienyl) cobalt(II), (trimethylenemethane)tricarbonylcobalt (II), bis(butadiene) carbonylcobalt (0), butadienetricarbonylcobalt(0), and bis (cyclooctatetraene) cobalt(0).

Suitable cobalt halides include, but are not limited to, cobalt(II) fluoride, cobalt(III) fluoride, cobalt(II) chloride, cobalt(III) chloride, cobalt(II) bromide, cobalt(III) bromide, and cobalt(II) iodide. Some representative examples of suitable cobalt pseudo-halides include cobalt(II) cyanide, cobalt(III) cyanide, cobalt(II) cyanate, cobalt(III) cyanate, cobalt(II) thiocyanate, cobalt(III) thiocyanate, cobalt(II) azide, and cobalt(III) azide. Some representative examples of suitable cobalt oxyhalides include cobalt(III) oxychloride and cobalt(III) oxybromide.

As mentioned above, the cobalt-based catalyst includes an organoaluminum compound. Suitable organoaluminum compounds for use in the cobalt-based catalyst systems are described above with respect to the lanthanide-based catalyst system. In particular embodiments, the organoaluminum compound is an aluminoxane. In certain embodiments, an identical organoaluminum compound is included in both the cobalt-based system and lanthanide-based system. In some embodiments, the organoaluminum compound employed to form the lanthanide-based catalyst is sufficient for the preparation of the cobalt-based catalyst that is used for the polymerization of 1,3-butadiene into syndiotactic 1,2-polybutadiene, and therefore additional organoaluminum compound need not be introduced for purposes of the cobalt-based catalyst system. In some embodiments, additional organoaluminum compound may be added for purposes of the cobalt-based catalyst system. In other embodiments, a different organoaluminum compound is included in the cobalt-based catalyst than the organoaluminum compound included in the lanthanide-based catalyst.

The cobalt-based catalyst composition that is used to synthesize syndiotactic 1,2-polybutadiene may be formed by combining or mixing the foregoing catalyst ingredients. Although one or more active catalyst species are believed to result from the combination of the cobalt-based catalyst ingredients, the degree of interaction or reaction between the various catalyst ingredients or components is not known with any great degree of certainty. As with the lanthanide-based catalyst, the term "catalyst composition" has been employed to encompass a simple mixture of the ingredients, a complex of the various ingredients that is caused by physical or chemical forces of attraction, a chemical reaction product of the ingredients, or a combination of the foregoing.

The foregoing cobalt-based catalyst composition has a very high catalytic activity for polymerizing 1,3-butadiene into syndiotactic 1,2-polybutadiene over a wide range of catalyst concentrations and catalyst ingredient ratios. The polymers having the most desirable properties, however, are obtained within a narrower range of catalyst concentrations and catalyst ingredient ratios. Further, it is believed that the catalyst ingredients may interact to form an active catalyst species. Accordingly, the optimum concentration for any one catalyst ingredient is dependent upon the concentrations of the other catalyst ingredients.

In one or more embodiments, the molar ratio of the carbon disulfide to the cobalt-containing compound (CS2/Co) can be varied from about 0.5:1 to about 100:1, in other embodiments from about 1:1 to about 10:1, and in other embodiments from about 2:1 to about 5:1.

In one or more embodiments, where an organoaluminum compound is employed, the molar ratio of the organoaluminum to the cobalt-containing compound (Al/Co) can be varied from about 1:1 to about 200:1, in other embodiments from about 2:1 to about 20:1, and in other embodiments from about 5:1 to about 10:1.

The cobalt-based catalyst can be formed by various methods.

In one embodiment, the cobalt-based catalyst may be formed in situ by adding the individual catalyst ingredients to the polymerization mixture including cis-1,4-polybutadiene in either a stepwise or simultaneous manner. In particular embodiments, the cobalt-containing compound is added first, followed by the organoaluminum compound, and then followed by the carbon disulfide.

In another embodiment, the cobalt-based catalyst may be preformed. That is, the individual catalyst ingredients are pre-mixed outside the polymerization mixture including the cis-1,4-polybutadiene either in the absence of any monomer or in the presence of a small amount of 1,3-butadiene monomer at an appropriate temperature, which may be from about −20° C. to about 80° C. The amount of 1,3-butadiene monomer that may be used for preforming the catalyst can range from about 1 to about 500 moles, in other embodiments from about 5 to about 250 moles, and in other embodiments from about 10 to about 100 moles per mole of the cobalt-containing compound. The resulting preformed catalyst may be aged, if desired, prior to being added to the polymerization mixture including the cis-1,4-polybutadiene.

In yet another embodiment, the cobalt-based catalyst may be formed by using a two-stage procedure. The first stage involves combining the cobalt-containing compound with the organoaluminum compound either in the absence of any monomer or in the presence of a small amount of 1,3-butadiene monomer at an appropriate temperature, which may be from about −20° C. to about 80° C. The amount of monomer employed in the first stage may be similar to that set forth above for preforming the catalyst. In the second stage, the foregoing reaction mixture and the carbon disulfide are charged in either a stepwise or simultaneous manner to the polymerization mixture including the cis-1,4-polybutadiene.

In one or more embodiments, additional 1,3-butadiene monomer and optionally additional solvent may be introduced to the polymerization mixture including cis-1,4-polybutadiene. In certain embodiments, the additional 1,3-butadiene monomer and optionally additional solvent may be introduced to the polymerization mixture prior to introduction of the cobalt-based catalyst or any component thereof. In other embodiments, the additional 1,3-butadiene monomer and optionally additional solvent may be introduced to the polymerization mixture after introduction of the cobalt-based catalyst. In other embodiments, the additional 1,3-butadiene monomer and optionally additional solvent may be introduced to the polymerization mixture simultaneously with the cobalt-based catalyst or any component thereof. In these or other embodiments, the additional 1,3-butadiene monomer and optionally additional solvent may be introduced prior to, during, and after introduction of the cobalt-based catalyst. The additional solvent may be the same as or different from the solvent, if any, that is employed in preparing the polymerization mixture including the cis-1,4-polybutadiene. Exemplary solvents have been set forth above.

Several factors can impact the amount of 1,3-butadiene, if any, added to the polymerization mixture including the cis-1,4-polybutadiene. For example, the amount may depend on the amount of 1,3-butadiene remaining after formation of the desired amount of cis-1,4-polybutadiene. In other embodiments, the amount may depend on the desired composition of the final product; i.e. the amount of the cis-1,4-polybutadiene relative to that of the syndiotactic 1,2-polybutadiene within the blend of the cis-1,4-polybutadiene and the syndiotactic 1,2-polybutadiene. In some embodiments, the amount of 1,3-butadiene remaining after the formation of the desired amount of cis-1,4-polybutadiene is sufficient for the formation of syndiotactic 1,2-polybutadiene, and therefore additional 1,3-butadiene need not be introduced.

In one or more embodiments, the total amount of the 1,3-butadiene provided for the synthesis of syndiotactic 1,2-polybutadiene within the polymerization mixture containing the cis-1,4-polybutadiene may be from about 0.1 to about 100 gram, in other embodiments from about 1 to about 50 gram, and in still other embodiments from about 2 to about 25 gram per 100 gram of the cis-1,4-polybutadiene within the polymerization mixture.

In one or more embodiments, the amount of the cobalt-containing compound used for polymerizing 1,3-butadiene into syndiotactic 1,2-polybutadiene can be varied from about 1 to about 10 mmol, in other embodiments from about 1.5 to about 8 mmol, and in still other embodiments from about 2 to about 5 mmol per mmol of the lanthanide compound.

In those embodiments where a polymerization modulator is employed in synthesizing the cis-1,4-polybutadiene, the amount of the cobalt-containing compound used for polymerizing 1,3-butadiene into syndiotactic 1,2-polybutadiene can be varied from about 2 to about 100 mmol, in other embodiments from about 8 to about 50 mmol, and in still other embodiments from about 10 to about 20 mmol per mmol of the lanthanide compound. In these or other embodiments, where a polymerization modulator is employed in synthesizing the cis-1,4-polybutadiene, the amount of the cobalt-containing compound used for polymerizing 1,3-butadiene into syndiotactic 1,2-polybutadiene is at least 2 mmol, in other embodiments at least 3 mmol, and in other embodiments at least 5 mmol per mmol of the lanthanide compound.

The process of this invention may be conducted in any conventional polymerization vessels known in the art. In one or more embodiments, such as where the polymerization mixture includes sufficient solvent to conduct a solution polymerization, the process may be conducted in a conventional stirred-tank reactor. In other embodiments, such as where the amount of solvent is limited and a bulk polymerization is conducted, the process can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the process may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

The process of this invention can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 150° C., in other embodiments from about 0° C. to about 130° C., and in other embodiments from about 20° C. to about 110° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmospheres, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

In one or more embodiments, both the formation of the cis-1,4-polybutadiene and the formation of the syndiotactic 1,2-polybutadiene take place within a single vessel (e.g., a conventional stirred-tank reactor). In these or other embodiments, the respective catalyst compositions (i.e. the lanthanide-based catalyst and the cobalt-based catalyst) can be formed within this single vessel (i.e. in situ formation of the catalysts) or one or both of the catalyst compositions may be pre-formed or partially pre-formed in one or more separate vessels and then transferred to the vessel where the polymerization of monomer (or at least a major portion thereof) may be conducted.

In yet other embodiments, the formation of the cis-1,4-polybutadiene and the formation of the syndiotactic 1,2-polybutadiene are conducted in different reaction vessels (e.g. different conventional stirred-tank reactors). For example, the cis-1,4-polybutadiene may be prepared in a first vessel, and then the polymerization mixture including the cis-1,4-polybutadiene may be transferred to a second vessel where the cobalt-based catalyst introduced to the polymerization mixture and syndiotactic 1,2-polybutadiene is prepared. As indicated above, the synthesis of the syndiotactic 1,2-polybutadiene may take place without quenching, purifying, or otherwise manipulating the polymerization mixture containing the cis-1,4-polybutadiene even though more than one vessel may be employed.

In particular embodiments, the process of this invention is a continuous process where the synthesis of the cis-1,4-polybutadiene and the synthesis of the syndiotactic 1,2-polybutadiene occur within a distinct zone of the process. For example, the polymerization of 1,3-butadiene into cis-1,4-polybutadiene (or at least a portion thereof) occurs within a zone of the process (e.g., a reactor), which zone may be referred to as a first zone. After a desired monomer conversion, the polymerization mixture is removed from the first zone and introduced to a subsequent zone (e.g., a downstream reactor), which may be referred to as a second zone, where the cobalt-based catalyst can be introduced to the polymerization mixture and syndiotactic 1,2-polybutadiene is synthesized. In particular embodiments, especially where bulk polymerization is conducted, the polymerization mixture is removed from the first zone prior to complete monomer conversion (e.g., prior to 50% conversion), and the cobalt-based catalyst is added to the polymerization mixture in the second zone. As indicated above, the synthesis of the syndiotactic 1,2-polybutadiene may take place without quenching, purifying, or otherwise manipulating the polymerization mixture containing the cis-1,4-polybutadiene even though more than one zone of a reactor may be employed.

In one or more embodiments, after the cobalt-based catalyst is added to the polymerization mixture and a desired degree of polymerization has been accomplished or completed, a quenching agent can be added to the polymerization mixture in order inactivate any residual reactive polymer chains, and/or inactivate the catalyst, catalyst components and/or catalyst residues. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product. Additionally, the polymer product can be oil extended by adding an oil to the polymer, which may be in the form of a polymer cement or polymer dissolved or suspended in monomer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The blend of cis-1,4-polybutadiene and syndiotactic 1,2-polybutadiene may be recovered from the polymerization mixture by using techniques known in the art. In one or more embodiments, desolventization and drying techniques may be used. For instance, the blend of cis-1,4-polybutadiene and syndiotactic 1,2-polybutadiene can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the blend of cis-1,4-polybutadiene and syndiotactic 1,2-polybutadiene can also be recovered by subjecting the polymerization mixture to steam desolventization, followed by drying the resulting polymer crumbs in a hot air tunnel. The blend of cis-1,4-polybutadiene and syndiotactic 1,2-polybutadiene can also be recovered by directly drying the polymerization mixture on a drum dryer.

In one or more embodiments, the blend of cis-1,4-polybutadiene and syndiotactic 1,2-polybutadiene may include from about 10 to about 90 percent, in other embodiments from about 30 to about 70 percent, and in other embodiments from about 40 to about 60 percent cis-1,4-polybutadiene based on the entire weight of the blend (i.e., the weight of the cis-1,4-polybutadiene and syndiotactic 1,2-polybutadiene combined).

In one or more embodiments, the cis-1,4-polybutadiene may have a cis-1,4 linkage content in excess of 96%, in other embodiments in excess of 97%, in other embodiments in excess of 98%, in other embodiments in excess of 99.0%, in other embodiments in excess of 99.1%, in other embodiments in excess of 99.2%, and in other embodiments in excess of 99.3%. In these or other embodiments, the cis-1,4-polybutadiene may have a molecular weight distribution of less than 2.5, in other embodiments less than 2.2, in other embodiments less than 2.0, in other embodiments less than 1.8, and in other embodiments less than 1.6.

In one or more embodiments, the blend of cis-1,4-polybutadiene and syndiotactic 1,2-polybutadiene may be used in preparing rubber compositions that can be used to manufacture tire components. Rubber compounding techniques and the additives employed therein are generally disclosed in *The Compounding and Vulcanization of Rubber*, in *Rubber Technology* ($2^{nd}$ Ed. 1973).

The rubber compositions can be prepared by using the blend of cis-1,4-polybutadiene and syndiotactic 1,2-polybutadiene alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y.

Coran, *Vulcanization*, ENCYCLOPEDIA OF POLYMER SCIENCE AND ENGINEERING, (2nd Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference.

The rubber compositions prepared from the blend of cis-1,4-polybutadiene and syndiotactic 1,2-polybutadiene are particularly useful for forming tire components such as treads, subtreads, sidewalls, body ply skims, bead filler, and the like. In particular embodiments, the blend of cis-1,4-polybutadiene and syndiotactic 1,2-polybutadiene are employed in tread and sidewall formulations.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities ($ML_{1+4}$) of the polymer samples were determined at 100° C. by using a Monsanto Mooney viscometer with a large rotor, a one-minute warm-up time, and a four-minute running time. The number average (Mn) and weight average (Mw) molecular weights of the polymer samples were determined by gel permeation chromatography (GPC). Cold flow resistance measurements were measured using a Scott Tester with cylinder-shaped polymer samples. Each cylinder-shaped polymer sample (weight=1.9 g, height=12.7 mm, radius=9.5 mm) was pressed with a 5 kg mass. Final height of the polymer samples was recorded after compression for 8 minutes. A control line was calculated using cis-1,4-polybutadienes at various $ML_{1+4}$. The cis-1,4-linkage, trans-1,4-linkage, and 1,2-linkage contents of the polymer samples were determined by infrared spectroscopy. The melting point of the polymer samples was determined by differential scanning calorimetry.

Example 1

The polymerization reactor consisted of a one-gallon stainless cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket chilled by cold water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at 32° C., the polymerization was initiated by charging into the reactor a preformed catalyst that had been prepared by mixing in the following order 6.5 g of 19.2 wt % 1,3-butadiene in hexane, 1.44 ml of 0.054 M neodymium versatate in hexane, 5.20 ml of 1.5 M methylaluminoxane (MAO) in toluene, 2.42 ml of 1.0 M diisobutylaluminum hydride (DIBAH) in hexane, and 6.24 ml of 0.017 M triiodomethane ($CHI_3$) in hexane and allowing the mixture to age for 15 minutes. After 4.5 minutes from its commencement, the polymerization mixture was treated with 5.2 ml of 0.03 M cobalt 2-ethylhexanoate ($CoOct_2$) in hexane and 3.8 mL of 0.2 M carbon disulfide ($CS_2$) in hexane. After stirring for 15 minutes, the polymerization was terminated by diluting the polymerization mixture with 6.0 ml isopropanol dissolved in 1360 g of hexane and dropping the batch into 11 L of isopropanol containing 5 g of 2,6-di-tert-butyl-4-methylphenol. The coagulated polymer, which was a blend of cis-1,4-polybutadiene (BR) and syndiotactic 1,2-polybutadiene (SPB), was drum-dried. Polymer characterization data is set forth in Table 1.

TABLE 1

| Example | 1 | 2 | 3 | 4 | 5 |
|---|---|---|---|---|---|
| Nd per 100 gram Butadiene (mmol) | 0.006 | 0.006 | 0.006 | 0.006 | 0.006 |
| NdV/MAO/DIBAH/CHI$_3$ | 1/100/31/1.3 | 1/100/32/1.3 | 1/100/31/1.3 | 1/100/31/1.3 | 1/100/31/1.3 |
| NdV/CoOct$_2$ | 1/2 | 1/0 | 1/1 | 1/2 | 1/2 |
| CoOct$_2$/MAO/CS$_2$ | 1/0/5 | — | 1/0/5 | 1/100/5 | 1/100/5 |
| CoOct$_2$/MAO/CS$_2$ Charging Method | separate addition | — | separate addition | separate addition | preformed |
| BR Polymerization Time (minute) | 4.3 | 4.5 | 5.0 | 4.8 | 4.0 |
| BR Polymerization Temperature (° C.) | 32→33 | 32→32 | 32→32 | 32→32 | 32→33 |
| SPB Polymerization Time (minute) | 15.0 | — | 15.0 | 15.0 | 15.0 |
| SPB Polymerization Temperature (° C.) | 32→32 | — | 32→32 | 32→41 | 32→39 |
| % Conversion | 14.1 | 14.1 | 15.6 | 17.0 | 16.9 |
| ML$_{1+4}$ | 62.6 | 21.7 | 56.6 | 75.4 | 64.1 |
| Mn (X10$^3$) (g/mol) | 162 | 144 | 166 | 166 | 169 |
| Mw (X10$^3$) (g/mol) | 251 | 187 | 256 | 248 | 254 |
| Mw/Mn | 3.70 | 1.31 | 1.54 | 1.50 | 1.50 |
| % Cis | 95.25 | 98.60 | 97.91 | 94.56 | 95.37 |
| % Trans | 1.05 | 1.12 | 1.09 | 0.90 | 1.12 |
| % Vinyl | 3.70 | 0.27 | 1.00 | 4.54 | 3.51 |
| BR Tm (° C.) | −6.65 | −6.37 | −6.90 | −6.91 | −6.98 |
| SPB Tm (° C.) | 203.4 | — | 201.24 | 203.81 | 203.41 |
| Cold Flow Resistance (mm at 8 minutes) | 2.73 | 1.33 | 2.24 | 3.02 | 2.44 |

Comparative Example 2

The same procedure as described in Example 1 was used in Example 2 except 2.50 ml of 1.0 M DIBAH in hexane was used and CoOct$_2$ and CS$_2$ were not added to the polymerization mixture. Polymer characterization data is set forth in Table 1.

Example 3

The same procedure as described in Example 1 was used in Example 3 except 2.6 ml of 0.03 M CoOct$_2$ in hexane and 1.9 mL of 0.2 M CS$_2$ in hexane was added to the polymerization mixture. Polymer characterization data is set forth in Table 1.

Example 4

The same procedure as described in Example 1 was used in Example 4 except 10.4 ml of 1.5 M MAO in toluene, 5.2 ml of 0.03 M CoOct$_2$ in hexane, and 3.8 mL of 0.2 M CS$_2$ in hexane was added to the polymerization mixture. Polymer characterization data is set forth in Table 1.

Example 5

The same procedure as described in Example 4 was used in Example 5 except a preformed catalyst was charged to the polymerization mixture that had been prepared by mixing in the following order 20.0 g of 19.2 wt % 1,3-butadiene in hexane, 5.2 ml of 0.03 M CoOct$_2$ in hexane, 10.4 ml of 1.5 M MAO in toluene, and 3.8 mL of 0.2 M CS$_2$ in hexane. Polymer characterization data is set forth in Table 1.

Comparing Example 1 with Comparative Example 2, formation of syndiotactic 1,2-polybutadiene within the cis-1,4-polybutadiene is evidenced by the detection of the melting point of the syndiotactic 1,2-polybutadiene. Although the cis-1,4-polybutadiene component of the blend had a cis content above 98.5% and a vinyl content below 0.3%, the presence of the syndiotactic 1,2-polybutadiene component caused an increase in the vinyl content and a decrease in the cis content of the microstructure of the entire blend composition. When accounting for the increase in ML$_{1+4}$ exhibited by Example 1 over Comparative Example 2, Example 1 has improved cold flow resistance when compared to the control line as shown in FIG. 1. The control line was prepared by employing three control polymers that were prepared using techniques similar to Comparative Example 2. The first polymer was characterized by a Mooney viscosity (ML$_{1+4}$) of 12.8, the second 50.8, and the third 79.7.

Comparing Example 3 with Comparative Example 2, formation of syndiotactic 1,2-polybutadiene within the cis-1,4-polybutadiene is evidenced by the detection of the melting point of the syndiotactic 1,2-polybutadiene and the increase in vinyl content of the polymer blend. When accounting for the increase in ML$_{1+4}$ exhibited by Example 3 over Comparative Example 2, Example 3 has improved cold flow resistance when compared to the control line as shown in FIG. 1.

Comparing Example 4 with Comparative Example 2, formation of syndiotactic 1,2-polybutadiene within the cis-1,4-polybutadiene is evidenced by the detection of the melting point of the syndiotactic 1,2-polybutadiene and the increase in vinyl content of the polymer blend. Comparing Example 4 with Example 1 shows that the additional MAO added to the syndiotactic 1,2-polybutadiene catalyst causes an increase in syndiotactic 1,2-polybutadiene conversion When accounting for the increase in ML$_{1+4}$ exhibited by Example 4 over Comparative Example 2, Example 4 has improved cold flow resistance when compared to the control line as shown in the FIGURE.

Comparing Example 5 with Comparative Example 2, formation of syndiotactic 1,2-polybutadiene within the cis-1,4-polybutadiene is evidenced by the detection of the melting point of the syndiotactic 1,2-polybutadiene and the increase in vinyl content of the polymer blend. Comparing Example 5 with Example 4, a blend of syndiotactic 1,2- polybutadiene and cis-1,4-polybutadiene was prepared using a preformed syndiotactic 1,2-polybutadiene catalyst and syndiotactic 1,2-polybutadiene (SPB), was drum-dried. Polymer characterization data is set forth in Table 2.

TABLE 2

| Example | 6 | 7 | 8 | 9 | 10 |
|---|---|---|---|---|---|
| Nd per 100 gram Butadiene (mmol) | 0.006 | 0.006 | 0.006 | 0.006 | 0.006 |
| NdV/MAO/DIBAH/CBr$_4$ | 1/100/33/1 | 1/100/33/1 | 1/100/36/1 | 1/100/32/1 | 1/100/33/1 |
| Pyridine/Nd | 40/1 | 40/1 | — | 40/1 | 40/1 |
| NdV/CoOct$_2$ | 1/10 | 1/0 | — | 1/2 | 1/10 |
| CoOct$_2$/MAO/CS$_2$ | 1/0/5 | — | — | 1/0/5 | 1/10/5 |
| BR Polymerization Time (minute) | 15.3 | 15.3 | 1.6 | 7.5 | 8.3 |
| BR Polymerization Temperature (° C.) | 33→33 | 33→33 | 32→39 | 32→33 | 32→34 |
| SPB Polymerization Time (minute) | 15.0 | — | — | 30.0 | 15.0 |
| SPB Polymerization Temperature (° C.) | 32→32 | — | — | 32→32 | 32→32 |
| % Conversion | 13.5 | 14.1 | 10.4 | 12.3 | 14.1 |
| ML$_{1+4}$ | 54.2 | 27.4 | 7.9 | 48.9 | 90.5 |
| Mn (X10$^3$) (g/mol) | 97 | 110 | 96 | 133 | 120 |
| Mw (X10$^3$) (g/mol) | 204 | 221 | 152 | 246 | 233 |
| Mw/Mn | 2.1 | 2.01 | 1.58 | 1.86 | 1.94 |
| % Cis | 95.65 | 99.31 | 98.03 | 97.02 | 96.79 |
| % Trans | 0.75 | 0.50 | 1.74 | 0.80 | 0.90 |
| % Vinyl | 3.60 | 0.19 | 0.23 | 2.17 | 2.30 |
| BR Tm (° C.) | −5.06 | −6.37 | — | −5.4 | −6.34 |
| SPB Tm (° C.) | 175.28 | — | — | — | 201.75 |
| Cold Flow Resistance (mm at 8 minutes | 4.02 | 1.66 | — | — | 5.69 | and this blend is similar to the polymer blend prepared by separately adding the syndiotactic 1,2-polybutadiene catalyst components. When accounting for the increase in ML$_{1+4}$ exhibited by Example 5 over Comparative Example 2, Example 5 has improved cold flow resistance when compared to the control line as shown in the FIGURE.

Example 6

A polymerization reactor as described in Example 1 was employed. The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer and 7.8 ml of 0.4 M pyridine was charged into the reactor. After the monomer was thermostated at 32° C., the polymerization was initiated by charging into the reactor a preformed catalyst that had been prepared by mixing in the following order 6.5 g of 19.2 wt % 1,3-butadiene in hexane, 1.44 ml of 0.054 M neodymium versatate in hexane, 5.20 ml of 1.5 M methyluminoxane (MAO) in toluene, 2.57 ml of 1.0 M diisobutylaluminum hydride (DIBAH) in hexane, and 3.12 ml of 0.025 M tetrabromomethane (CBr$_4$) in hexane and allowing the mixture to age for 15 minutes. After 15.3 minutes from its commencement, the polymerization mixture was treated with 0.42 ml of 1.9 M cobalt 2-ethylhexanoate (CoOct$_2$) in mineral spirits and 0.24 ml of pure carbon disulfide (CS$_2$). After stirring for 15 minutes, the polymerization was terminated by diluting the polymerization mixture with 6.0 ml isopropanol dissolved in 1360 g of hexane and dropping the batch into 11 L of isopropanol containing 5 g of 2,6-di-tert-butyl-4-methylphenol. The coagulated polymer, which was a blend of cis-1,4-polybutadiene (BR)

Comparative Example 7

The same procedure as described in Example 6 was used in Example 7 except that CoOct$_2$ and CS$_2$ were not added to the polymerization mixture. Polymer characterization data is set forth in Table 2.

Comparative Example 8

The same procedure as described in Example 7 was used in Example 8 except that 2.8 ml of 1 M DIBAH in hexane was used and pyridine was not added to the 1,3-butadiene monomer. Polymer characterization data is set forth in Table 2.

Comparative Example 9

The same procedure as described in Example 6 was used in Comparative Example 9 except that 2.50 ml of 1.0 M DIBAH in hexane, 5.2 ml of 0.03 M CoOct$_2$ in hexane, and 3.8 ml of 0.2 M CS$_2$ in hexane were used. Polymer characterization data is set forth in Table 2.

Example 10

The same procedure as described in Example 6 was used in Example 10 except that 2.57 ml of 1.0 M DIBAH in hexane was used and 5.2 ml of MAO was added before the addition of CoOct$_2$ and CS$_2$. Polymer characterization data is set forth in Table 2.

Comparing Example 6 with Comparative Example 7, a blend of syndiotactic 1,2-polybutadiene and cis-1,4-polybutadiene is evidenced by the detection of the melting point of the syndiotactic 1,2-polybutadiene. Further, the decrease in cis content and the corresponding rise in vinyl content in Example 6 is further evidence of the formation of syndiotactic 1,2-polybutadiene since the cis-1,4-polybutadiene was produced under identical conditions in both Example 6 and Comparative Example 7. Also, Example 6 has improved cold flow resistance when compared to Comparative Example 7 due to the presence of syndiotactic 1,2-polybutadiene as shown in the FIGURE.

Comparing Example 6 with Comparative Example 8, the absence of pyridine caused a fast polymerization rate and excessive exotherm. The polymerization had to be terminated to prevent a runaway bulk polymerization reaction which prevented the addition of the cobalt catalyst. The addition of the pyridine in Example 6 controlled the polymerization rate and allowed for the addition of the cobalt catalyst. Likewise, the addition of the pyridine provided cis contents above 99.0%.

Comparing Example 6 with Comparative Example 9, in the presence of pyridine, a NdV/CoOct$_2$ ratio of 1/2 does not lead to the formation of syndiotactic 1,2-polybutadiene while increasing NdV/CoOct$_2$ ratio to 1/10 forms syndiotactic 1,2-polybutadiene in the presence of pyridine.

Comparing Example 6 with Example 10, the addition of supplementary MAO provides a syndiotactic 1,2-polybutadiene with an increased melting point in the blend. Example 10 had increased cold flow resistance when compared to Example 6, which suggests that an increased amount of syndiotactic 1,2-polybutadiene formed upon the addition of supplementary MAO as shown in the FIGURE.

Various modifications and alterations that do not depart from the scope and spirit of this invention will become apparent to those skilled in the art. This invention is not to be duly limited to the illustrative embodiments set forth herein.

What is claimed is:

1. A process for preparing a blend of cis-1,4-polybutadiene and syndiotactic 1,2-polybutadiene, the process comprising the steps of:
   (i) polymerizing 1,3-butadiene in the presence of a lanthanide-based catalyst to form a polymerization mixture including cis-1,4-polybutadiene that includes less than 20 percent by weight solvent based upon the total weight of the polymerization mixture, and
   (ii) polymerizing 1,3-butadiene in the presence of a cobalt-based catalyst within the polymerization mixture including cis-1,4-polybutadiene that includes less than 20 percent by weight solvent based upon the total weight of the polymerization mixture to form syndiotactic 1,2-polybutadiene and thereby produce a blend of cis-1,4-polybutadiene and syndiotactic 1,2-polybutadiene.

2. The process of claim 1, where the lanthanide-based catalyst includes (a) a lanthanide-containing compound, (b) an alkylating agent, and (c) a halogen source.

3. The process of claim 2, where said step of polymerizing 1,3-butadiene in the presence of a lanthanide-based catalyst takes place in the presence of a polymerization modulator.

4. The process of claim 3, where the halogen source includes a bromine-containing compound.

5. The process of claim 4, where the polymerization modulator includes an amine compound.

6. The process of claim 1, where the cobalt-based catalyst includes (a) a cobalt-containing compound, (b) carbon disulfide, and (c) an organoaluminum compound.

7. The process of claim 2, where the cobalt-based catalyst includes (a) a cobalt-containing compound, (b) carbon disulfide, and (c) an organoaluminum compound, and where said step of polymerizing 1,3-butadiene in the presence of a cobalt-based catalyst employs from about 1 to about 10 mmol cobalt-containing compound per mmol of lanthanide compound.

8. The process of claim 3, where the cobalt-based catalyst includes (a) a cobalt-containing compound, (b) carbon disulfide, and (c) an organoaluminum compound, and where said step of polymerizing 1,3-butadiene in the presence of a cobalt-based catalyst employs from about 2 to about 100 mmol cobalt-containing compound per mmol of lanthanide compound.

9. The process of claim 1, where said step of polymerizing 1,3-butadiene in the presence of a lanthanide-based catalyst takes place within a polymerization mixture that includes less than 5 percent by weight solvent based upon the total weight of the polymerization mixture.

10. The process of claim 3, where said step of polymerizing 1,3-butadiene in the presence of a cobalt-based catalyst takes place within a polymerization mixture that includes less than 5 percent by weight solvent based upon the total weight of the polymerization mixture.

11. The process of claim 1, where said step of polymerizing 1,3-butadiene in the presence of a lanthanide-based catalyst takes place within a first vessel, and where said step of polymerizing 1,3-butadiene in the presence of a cobalt-based catalyst takes place within a second vessel.

12. The process of claim 1, where said step of polymerizing 1,3-butadiene in the presence of a lanthanide-based catalyst and said step of polymerizing 1,3-butadiene in the presence of a cobalt-based catalyst takes place within a single vessel.

13. The process of claim 1, where said step of polymerizing 1,3-butadiene in the presence of a lanthanide-based catalyst takes place within a first zone of a reactor, and where said step of polymerizing 1,3-butadiene in the presence of a cobalt-based catalyst takes place within a second zone of the reactor.

14. A process for preparing a blend of cis-1,4-polybutadiene and syndiotactic 1,2-polybutadiene, the process comprising:
   (i) introducing a lanthanide-based catalyst and 1,3-butadiene monomer to form a polymerization mixture that includes less than 20 percent by weight solvent based upon the total weight of the polymerization mixture;
   (ii) allowing the 1,3-butadiene monomer to polymerize to form cis-1,4-polybutadiene and thereby form a polymerization mixture including cis-1,4-polybutadiene and further includes less than 20 percent by weight solvent based upon the total weight of the polymerization mixture;
   (iii) introducing a cobalt-based catalyst to the polymerization mixture including the cis-1,4-polybutadiene; and
   (iv) allowing the 1,3-butadiene monomer to polymerize to form syndiotactic 1,2-polybutadiene within the polymerization mixture including the cis-1,4-polybutadiene.

15. The process of claim 14, where said step of introducing a cobalt-based catalyst takes place after the conversion of 1,3-butadiene monomer to cis-1,4-polybutadiene reaches at least 5% and before the conversion of 1,3-butadiene to cis-1,4-polybutadiene reaches at most 90%.

16. A process for preparing a blend of cis-1,4-polybutadiene and syndiotactic 1,2-polybutadiene, the process comprising:
   (i) providing an active polymerization mixture including a propagating cis-1,4-polybutadiene polymer that includes less than 20 percent by weight solvent based upon the total weight of the polymerization mixture; and (ii) adding a cobalt-based catalyst to the active polymerization mixture including the propagating cis-1,4-polybutadiene polymer.

17. The process of claim 16, further comprising the step of adding 1,3-butadiene monomer to the active polymerization mixture.

18. The process of claim 16, where the polymerization mixture includes less than 5 percent by weight solvent based on the total weight of the polymerization mixture.

19. The process of claim 1, further comprising preparing a vulcanizable composition by combining the blend of cis-1,4-polybutadiene and syndiotactic 1,2-polybutadiene, a filler, and a curing agent.

20. The process of claim 1, further comprising preparing a tire component employing the blend of cis-1,4-polybutadiene and syndiotactic 1,2-polybutadiene.

* * * * *